US012692462B2

(12) United States Patent
Locher et al.

(10) Patent No.: US 12,692,462 B2
(45) Date of Patent: Jul. 28, 2026

(54) TWO-IN-ONE DISHWASH DETERGENT

(71) Applicant: ECOLAB USA INC., Saint Paul, MN (US)

(72) Inventors: Sascha Locher, Monheim (DE); Jonathan Scott Killeen, Mannheim (DE); Carmen Cardenal Pac, Düsseldorf (DE); Nathan D. Peitersen, Saint Paul, MN (US); Allison Prideaux, Saint Paul, MN (US); David D. McSherry, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 696 days.

(21) Appl. No.: 17/757,895

(22) PCT Filed: Dec. 23, 2019

(86) PCT No.: PCT/EP2019/086964
§ 371 (c)(1),
(2) Date: Jun. 23, 2022

(87) PCT Pub. No.: WO2021/129930
PCT Pub. Date: Jul. 1, 2021

(65) Prior Publication Data
US 2023/0024364 A1 Jan. 26, 2023

(51) Int. Cl.
*C11D 1/90* (2006.01)
*C11D 1/72* (2006.01)
(Continued)

(52) U.S. Cl.
CPC .................. *C11D 3/48* (2013.01); *C11D 1/72* (2013.01); *C11D 1/722* (2013.01); *C11D 1/75* (2013.01);
(Continued)

(58) Field of Classification Search
CPC .. C11D 1/72; C11D 1/722; C11D 1/75; C11D 1/90; C11D 1/94; C11D 3/2082; C11D 3/30; C11D 3/33
(Continued)

(56) References Cited

U.S. PATENT DOCUMENTS 4,107,328 A 8/1978 Michaels
6,323,171 B1 * 11/2001 Fonsny .................... C11D 1/94 516/69
(Continued)

FOREIGN PATENT DOCUMENTS

EP 2727991 A1 5/2014
EP 3015538 A1 5/2016
(Continued)

OTHER PUBLICATIONS

English Language machine translation of EP3542628. (Year: 2019).*
(Continued)

*Primary Examiner* — Gregory R Delcotto
(74) *Attorney, Agent, or Firm* — McKee, Voorhees & Sease, PLC

(57) ABSTRACT

The present invention relates to a concentrate composition and its use solution for disinfecting and cleaning hard surfaces. The concentrate composition and the use solution comprise an alkylamidopropyl betaine, amphoteric surfactants and biocidal active substances at a moderately alkaline pH. The inventive composition is suitable for disinfecting and cleaning hard surfaces, in particular hard surfaces in contact with food products, such as surfaces found in food processing, manual warewashing, food services and health care industries. Methods of applying and making such concentrate composition and use solution are also provided.

16 Claims, 3 Drawing Sheets

(51) Int. Cl.

| | |
|---|---|
| ***C11D 1/722*** | (2006.01) |
| ***C11D 1/75*** | (2006.01) |
| ***C11D 1/86*** | (2006.01) |
| ***C11D 1/94*** | (2006.01) |
| ***C11D 3/00*** | (2006.01) |
| ***C11D 3/20*** | (2006.01) |
| ***C11D 3/30*** | (2006.01) |
| ***C11D 3/33*** | (2006.01) |
| ***C11D 3/48*** | (2006.01) |

(52) U.S. Cl.
CPC .................. *C11D 1/90* (2013.01); *C11D 1/94* (2013.01); *C11D 3/0047* (2013.01); *C11D 3/2082* (2013.01); *C11D 3/30* (2013.01); *C11D 3/33* (2013.01); *C11D 2111/14* (2024.01)

(58) Field of Classification Search
USPC ........ 510/235, 237, 238, 477, 488, 499, 382
See application file for complete search history.

(56) References Cited

U.S. PATENT DOCUMENTS

| | | | | |
|---|---|---|---|---|
| 6,613,728 | B1 * | 9/2003 | Sirianni | A01N 35/04 510/378 |
| 6,841,090 | B1 * | 1/2005 | Serego Allighieri | A01N 31/02 252/186.1 |
| 7,723,281 | B1 | 5/2010 | Herdt et al. | |
| 2002/0169099 | A1 * | 11/2002 | Knox | C11D 3/0094 510/421 |
| 2009/0312225 | A1 * | 12/2009 | Szewczyk | C11D 3/48 510/407 |
| 2010/0227930 | A1 * | 9/2010 | Lusignan | C11D 1/62 514/642 |
| 2011/0230385 | A1 * | 9/2011 | Murphy | C11D 3/2086 510/382 |
| 2017/0015945 | A1 | 1/2017 | Larson | |
| 2017/0175041 | A1 * | 6/2017 | Ahirwal | C11D 3/30 |

FOREIGN PATENT DOCUMENTS

| | | | | |
|---|---|---|---|---|
| EP | 3263687 | A1 * | 1/2018 | C11D 1/835 |
| EP | 3444326 | A1 * | 2/2019 | C11D 1/44 |
| EP | 3542628 | A1 * | 9/2019 | A01N 33/04 |
| WO | 9743368 | A1 | 11/1997 | |
| WO | 0100024 | A1 | 1/2001 | |
| WO | WO-2008155518 | A1 * | 12/2008 | C11D 1/75 |
| WO | WO-2012123721 | A1 * | 9/2012 | A47L 13/17 |
| WO | 2018013523 | A1 | 1/2018 | |

OTHER PUBLICATIONS

Birnie et al., "Antimicrobial Evaluation of N-Alkyl Betaines and N-Alkyl-N, N-Dimethylamine Oxides with Variations in Chain Length", Antimicrobial Agents and Chemotherapy, vol. 44, No. 9, pp. 2514-2517, Sep. 2000.

International Searching Authority in connection with PCT/EP2019/086964 filed Dec. 23, 2019, "Written Opinion of the International Searching Authority", 13 pages, mailed Oct. 7, 2020.

Ivami, "EN 13697-Bactericidal and/or fungicidal activity on non-porous surfaces.NF EN 13697:2015 + A 1: 2019. Quantitative test for evaluation of bactericidal / fungicidal activity in food, industrial, domestic and institutional areas. Accredited by ENAC", 1 page, 2015.

Ivami, "EN 1276-Bactericidal activity under use conditions. NF EN 1276: 2019. Quantitative suspension test for evaluation of bactericidal activity in food, industrial, domestic and institutional areas (phase 2, step 1) Accredited by ENAC", 2 pages, 2019.

Summons to Attend Oral Proceedings Pursuant to Rule 115(1) EPC in Application No. EP19831753.9, mailed Apr. 30, 2026, 7 pages.

* cited by examiner

TWO-IN-ONE DISHWASH DETERGENT

CROSS REFERENCE TO RELATED APPLICATIONS

This is a U.S. National Phase application claiming priority to PCT/EP2019/086964, filed Dec. 23, 2019, the entire contents of which are hereby expressly incorporated by reference in its entirety including, without limitation, the specification, claims, and abstract, as well as any figures, tables, or drawings thereof.

The present invention relates to a concentrate composition and its use solution for disinfecting and cleaning hard surfaces. The concentrate composition and the use solution comprise an alkylamidopropyl betaine, amphoteric surfactants and biocidal active substances at a moderately alkaline pH. The inventive composition is suitable for disinfecting and cleaning hard surfaces, in particular hard surfaces in contact with food products, such as surfaces found in food processing, manual warewashing, food services and health care industries. Methods of applying and making such concentrate composition and use solution are also provided.

BACKGROUND

Cleaning compositions are used throughout residential and institutional settings in a variety of applications including the cleaning of surfaces receiving beverages and food products or other residues. Conventional compositions used for cleaning hard surfaces include alkaline detergents to remove soil, such as grease, starch, and protein, and to mitigate their redeposition. To ensure product quality and public health, hard surfaces are also commonly disinfected to kill bacteria, fungi, or similar microorganisms. Prior art disinfecting compositions often have an acidic pH for enhanced activity against microorganisms. However, it is known in the field that soil removal and especially grease removal is negatively impacted at acidic pH as fatty acids are less soluble in their protonated forms.

Furthermore quaternary ammonium compounds have become a commonplace antimicrobial and are widely used for sanitizing and biocidal active applications. Compositions comprising such compounds require a follow-up rinse step. However, recent regulatory scrutiny over quaternary ammonium compounds may change the utilization of these sanitizing and biocidal active compositions. Hence, there is also a need for a disinfecting and cleaning composition beneficially including only low amounts of quaternary ammonium compounds.

The prior art patent application U.S. Pat. No. 4,107,328 discloses an antimicrobial composition comprising an alkyl-N-betaine, an amine oxide and a protonating agent to adjust the pH of said composition from 4.0 to 5.5. The patent application U.S. Pat. No. 7,723,281 discloses an antimicrobial enzyme composition comprising an antimicrobial tertiary amine, a lipase, an organic acid, an amine oxide surfactant, a glycol ether solvent, and an aminocarboxylate. The patent application WO 97/43368 discloses a cleaning and/or disinfecting composition having a pH of 5 to 9 and comprising a tertiary alkyl amine and an alkyl betaine.

Thus there is a need for a user friendly two-in-one composition for hard surfaces having a disinfecting and cleaning effect, which advantageously eliminates the need for applying two separate compositions. Additionally there is a need for providing a use solution comprising low amounts of the concentrate composition, but which still has excellent cleaning and disinfecting capabilities.

OBJECT OF THE PRESENT INVENTION

One object of the invention therefore is to provide a disinfecting and cleaning concentrate composition, while also is effective at removing soils, in particular at removing grease. Another object of the invention is to provide a concentrate composition capable of being diluted with a major proportion of water or other aqueous based liquids to form a use solution comprising up to 6 wt. % of the concentrate composition. Such, use solution should still exhibiting cleaning activity and good disinfecting activity, according to the requirements of the European standard test methods EN 1650 (2019), EN 1276 (2019) and EN 13697 (2015)+A1 (2019).

BRIEF SUMMARY OF THE INVENTION

It has now surprisingly been found that in a first aspect, this object is solved by a disinfecting and cleaning concentrate composition, the composition comprising following components:

a) a biocidal active substance;

b) an amphoteric surfactant;

c) an alkylamidopropyl betaine, wherein the alkyl group consists of 6 to 19 carbon atoms;

d) a buffer system for adjusting the pH of said concentrate composition to 8 to 11; and e) water.

In a further aspect, the object is solved by an aqueous use solution that comprises up to 6 wt. % of this concentrate composition.

The concentrate composition and, its use solution provide excellent grease removal while disinfecting hard surfaces. A synergistic behaviour between alkylamidopropyl betaine, amphoteric surfactants and the biocidal active substance is surprisingly found at a mildly alkaline pH. Advantageously, said disinfecting effect is obtained without requiring quaternary ammonium compounds.

In a further aspect, a method for disinfecting and cleaning hard surfaces is provided, wherein the method comprises applying to the hard surface the inventive concentrate composition or the inventive use solution.

Said concentrate composition for disinfecting and cleaning hard surfaces can be made by combining the components a) to e) as defined above and agitating the combined components until a homogenous concentrate composition is formed.

Said use solution for disinfecting and cleaning hard surfaces can be made by combining components a) to e) as defined above, agitating the combined components until a homogenous concentrate composition is formed, and diluting the homogenous concentrate composition with water to obtain the use solution; wherein the use solution contains up to 6 wt. % of the concentrate composition.

While multiple embodiments are disclosed, still other embodiments of the present invention will become apparent to those skilled in the art from the following detailed description, which shows and describes illustrative embodiments of the invention.

Accordingly, the drawings and detailed description are to be regarded as illustrative in nature and not restrictive.

DETAILED DESCRIPTION OF THE INVENTION

Figure 1:
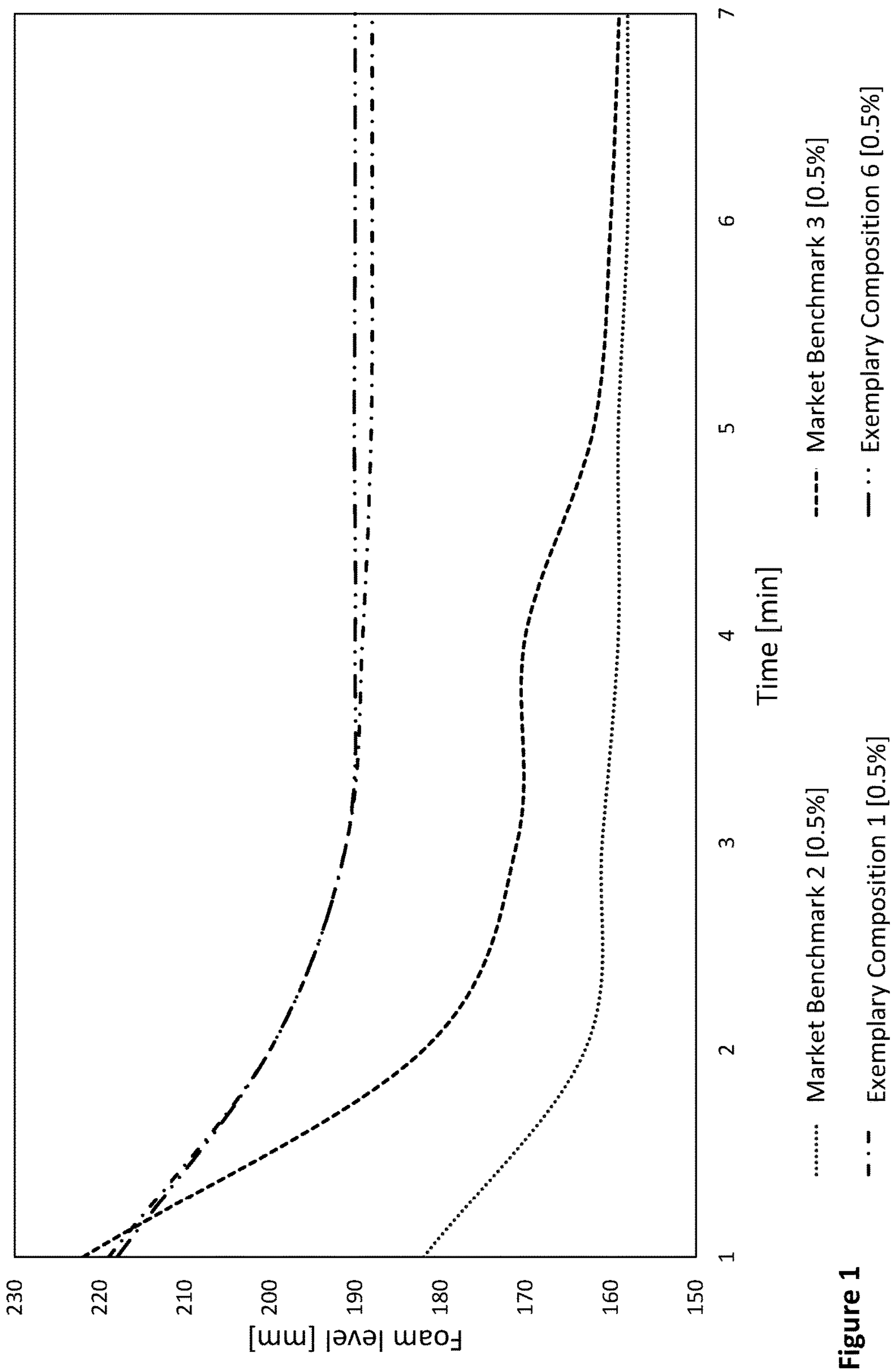
FIG. 1 shows the cleaning and foaming performance of the exemplary compositions 1 and 6 compared to the prior art compositions benchmark 2 and benchmark 3 according to the foam behaviour test.

Briefly, the disinfecting and cleaning concentrate composition comprises:

a) a biocidal active substance;

b) an amphoteric surfactant;

c) an alkylamidopropyl betaine, wherein the alkyl group consists of 6 to 19 carbon atoms;

d) a buffer system for adjusting the pH of said concentrate composition to 8 to 11; and e) water.

The concentrate composition is bactericidal and fungicidal in solution and on hard surfaces, while exhibiting excellent grease removal capacities. This concentrate composition may contain other useful compounds in the formulation to enhance the properties of the compounds or to add new properties.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

In describing and claiming the embodiments of the present invention, the following terminology will be used in accordance with the definitions set out below.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

As used herein, the term "aqueous" means a solution where the solvent is water, water based liquid or other miscible solution, etc.

The term "biocidal active substance" means a compound or a substance capable of providing a reduction in microorganisms according to one or more of the European standard test methods DIN EN 1650 (2019), DIN EN 1276 (2019) and DIN EN 13697 (2015)+A1 (2019).

As used herein, the term "chelating agent" means a compound having atoms which form a coordinate bond(s) with metals while in solution.

As used herein, the term "cleaning" refers to a method used to facilitate or aid in soil removal, grease removal, bleaching, rinsing, and any combination thereof.

As used herein, the terms "composition" and "solution" mean any mixture of two or more substances.

As used herein, the term "disinfecting" means a reduction in microorganisms according to one or more of the European, standard test DIN EN 1650 (2019), DIN EN 1276 (2019) and DIN EN 13697 (2015) in combination with the addition A1 (2019).

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the phrase "food product" includes any food substance that might require treatment with an antimicrobial agent or composition and that is edible with or without further preparation. Food products include meat (e.g. red meat and pork), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

As used herein, the term "hard surface" refers to a solid, substantially non-flexible surface such as a ware, counter top, tile, floor, wall, panel, window, plumbing fixture, kitchen and bathroom furniture, appliance, engine, circuit board, and dish. Hard surfaces may include, for example, health care surfaces and food processing surfaces.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "quaternary ammonium compounds" shall not refer to alkylamidopropyl betaine.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof.

As used herein, the term "soil" refers to polar or non-polar organic or inorganic substances including, but not limited to carbohydrates, proteins, fats, oils and the like. These substances may be present in their organic state or complexed to a metal to form an inorganic complex.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "surfactant" refers to an organic chemical that when added to a liquid changes the properties of that liquid at a surface.

As used herein, the term "ware" refers to items such as eating and cooking utensils, dishes, and other hard surfaces such as showers, sinks, toilets, bathtubs, countertops, windows, mirrors, transportation vehicles, and floors. The term "ware" generally refers to items such as eating and cooking utensils, dishes, and other hard surfaces. Ware also refers to items made of various substrates, including glass, ceramic, china, crystal, metal, plastic or natural substances such, but not limited to clay, bamboo, hemp and the like. Types of metals that can be cleaned with the compositions include but are not limited to, those that include aluminum, copper, brass, and stainless steel. Types of plastics that can be cleaned with the compositions include but are not limited to, those that include polypropylene (PP), high density polyethylene (HDPE), low density polyethylene (LDPE), polyvinyl chloride (PVC), styrene acrylonitrile (SAN), polycarbonate (PC), melamine formaldehyde resins or melamine resin (melamine), acrylonitrile-butadiene-styrene (ABS), and polysulfone (PS). Other exemplary plastics that can be cleaned using the compounds and compositions include polyethylene terephthalate (PET) polystyrene polyamide.

As used herein, "weight percent," "wt. %," "percent by weight," "% by weight," and variations thereof refer to the concentration of a substance as the weight of that substance divided by the total weight of the composition and multiplied by 100. It is understood that, as used here, "percent," "%" and the like are intended to be synonymous with "weight percent," "wt. %," etc. Further, the term "wt. %" refers to pure substances.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The concentrate composition may have a pH of 9 to 10.5, preferably the concentrate composition has a pH of 9.5 to 10.

The concentrate composition may be substantially free of one or more of primary alkanols, secondary alkanols, phosphorous-containing compounds and quaternary ammonium compounds.

Primary alkanols and secondary alkanols are compounds such as linear and branched $C_1$-$C_{10}$ alkanols, for example methanol, ethanol, isopropanol, propanol, butanol and the like.

The concentrate composition may contain 1 wt. % or below of quaternary ammonium compounds. Preferably, the concentrate composition contains 0.5 wt. % or below of quaternary ammonium compounds. More preferably, the concentrate composition is substantially free of quaternary ammonium compounds. Exemplary quaternary ammonium compounds are compounds such as alkyldimethylbenzyl ammonium chlorides, dialkylmethylbenzyl ammonium chlorides, dialkyldimethylammonium chlorides, alkyl dimethyl ethylbenzyl quaternary ammonium chlorides, benzethonium chloride, and dialkyl ammonium compounds. Alkyl ammonium compounds refer to compounds such as dimethyl dioctyl ammonium chloride and dimethyl didecyl ammonium chloride.

The concentrate composition may contain 1 wt. % or below of organic solvents. Preferably, the concentrate composition contains 0.5 wt. % or below of organic solvents. More preferably, the concentrate composition is substantially free of organic solvents. Organic solvents, are solvents such as, for instance, glycol ether, phenoxyethanol, diethylene glycol propyl ether, ethylene glycol monomethyl ether, ethylene glycol monoethyl ether, ethylene glycol monopropyl ether, ethylene glycol monoisopropyl ether, ethylene glycol monobutyl ether, diethylene glycol monomethyl ether, diethylene glycol monobutyl ether, diethylene glycol monoethyl ether, diethylene glycol n-butyl ether, ethylene glycol dimethyl ether, ethylene glycol diethyl ether, ethylene glycol dibutyl ether, propylene glycol n-butyl ether, propylene glycol n-propyl ether, tripropylene glycol methyl ether, dipropylene glycol methyl ether, dipropylene glycol butyl ether, dipropylene glycol n-propyl ether, and ethylene glycol hexyl ether.

The concentrate composition may contain 1 wt. % or below of phosphorous-containing compounds. Preferably, the concentrate composition contains 0.5 wt. % or below of phosphorous-containing compounds. More preferably, the concentrate composition is substantially free of phosphorous-containing compounds. Exemplary phosphorous-containing compounds are condensed phosphates and phosphonates.

The concentrate composition may contain 1 wt. % or below of enzymes. Preferably, the concentrate composition contains 0.5 wt. % or below of enzymes. More preferably, the concentrate composition is substantially free of enzymes. Exemplary types of enzymes include, but are not limited to lipases, cellulases, proteases, alpha-amylases, and mixtures thereof.

The concentrate composition may comprise:

a) 0.5 to 10 wt. % biocidal active substance;

b) 1 to 30 wt. % amphoteric surfactant;

c) 1 to 15 wt. % alkylamidopropyl betaine;

d) 1 to 30 wt. % buffer system; and
e) 20 to 80 wt. % water.

Preferably, the concentrate composition comprises:
a) 2 to 5 wt. % biocidal active substance;
b) 5 to 16 wt. % amphoteric surfactant;
c) 2 to 10 wt. % alkylamidopropyl betaine;
d) 5 to 15 wt. % buffer system; and
e) 30 to 70 wt. % water.

The concentrate composition may comprise 0.5 to 10 wt. % biocidal active substance, 1 to 9 wt. % biocidal active substance, 1 to 8 wt. % biocidal active substance, 1 to 7 wt. % biocidal active substance, 1 to 6 wt. % biocidal active substance, 2 to 5 wt. % biocidal active substance, 2.5 to 5 wt. % biocidal active substance, 3 to 5 wt. % biocidal active substance, 3.5 to 5 wt. % biocidal active substance, or 4 to 5 wt. % biocidal active substance.

The concentrate composition may comprise 1 to 30 wt. % amphoteric surfactant, 2 to 25 wt. % amphoteric surfactant, 3 to 20 wt. % amphoteric surfactant, 4 to 20 wt. % amphoteric surfactant, 7 to 20 wt. % amphoteric surfactant, 5 to 16 wt. % amphoteric surfactant, or 8 to 16 wt. % amphoteric surfactant.

The concentrate composition may comprise 1 to 15 wt. % alkylamidopropyl betaine, 1 to 14 wt. % alkylamidopropyl betaine, 1 to 13 wt. % alkylamidopropyl betaine, 1 to 12 wt. % alkylamidopropyl betaine, 1 to 11 wt. % alkylamidopropyl betaine, 1 to 10 wt. % alkylamidopropyl betaine, 2 to 10 wt. % alkylamidopropyl betaine, 3 to 10 wt. % alkylamidopropyl betaine, or 4 to 10 wt. % alkylamidopropyl betaine.

The concentrate composition may comprise 1 to 30 wt. % buffer system, 1 to 25 wt. % buffer system, 1 to 22 wt. % buffer system, 1 to 20 wt. % buffer system, 1 to 17 wt. % buffer system, 1 to 15 wt. % buffer system, 2 to 15 wt. % buffer system, 3 to 15 wt. % buffer system, 4 to 15 wt. % buffer system, or 5 to 15 wt. % buffer system.

The concentrate composition may comprise 20 to 80 wt. % water, 25 to 80 wt. % water, 30 to 80 wt. % water, 30 to 75 wt. % water, 30 to 70 wt. % water, 35 to 70 wt. % water, or 40 to 70 wt. % water.

The concentrate composition may further comprise one or more of soil release polymers, polymeric dispersants, polysaccharides, abrasives, tarnish inhibitors, builders, enzymes, dyes, buffers, perfumes, opacifiers, hydrotropes, thickeners, processing aids, suds boosters, brighteners, anti-corrosive aids, stabilizers, antioxidants, solvents, and chelants.

Preferably, the composition further comprises at least one dye, wherein more preferably the at least one dye is copper chlorophyll. The concentrate composition may comprise up to 5 wt. % of the dye, 4 wt. % of the dye, 3 wt. % of the dye or 2 wt. % of the dye. At least 0.001 wt. % of the dye, or 0.01 wt. % of the dye may be included in the concentrate composition.

Biocidal Active Substance

The biocidal active substance may comprise bis(3-aminopropyl)alkylamine, wherein the alkyl group consists of 6 to 18 carbon atoms, preferably wherein the bis(3-aminopropyl)alkylamine comprises one or more of bis(3-aminopropyl)octylamine, bis(3-aminopropyl)decylamine, bis(3-aminopropyl)dodecylamine, bis(3-aminopropyl)quatrodecylamine, bis(3-aminopropyl)hexadecylamine, and bis(3-aminopropyl)octadecylamine, more preferably wherein the bis(3-aminopropyl)alkylamine comprises bis(3-aminopropyl)dodecylamine. Most preferably, the biocidal active substance is bis(3-aminopropyl)dodecylamine.

Buffer System

The buffer system to stabilize the pH of the concentrate composition may comprise buffering adjuvants such as weak inorganic acids, organic acids, organic salts, and inorganic salts for buffering purposes. These might include an inorganic-based salt or weak inorganic acids including phosphates (including mono-, di-, or tri-basic potassium, calcium, or sodium phosphate), sulfates (including sodium, potassium, and magnesium sulfates), bisulfates, silicates (including sodium, potassium, and magnesium, silicates), borates (including sodium or potassium borates, and boric acid), sulfamic acid; organic-based compounds such as malic acid, tartaric acid, citric acid, acetic acid, glycolic, glutamic acid, sorbic acid, benzoic acid, adipic acid, succinic acid, diacetate salts, or dimer and fatty acids; or mixtures thereof.

The buffer system may be a citrate buffer system, preferably wherein the citrate buffer system is produced by combining trisodium citrate and citric acid monohydrate.

Surfactants

A variety of surfactants can be used in the present concentrate composition, such as anionic, non-ionic, cationic, and amphoteric surfactants. Surfactants provide grease removal and augment foam.

Suitable anionic surfactants are, for example, carboxylates such as alkylcarboxylates (carboxylic acid salts) and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, alkylether sulfates; and phosphate esters such as alkylphosphate esters. Exemplary anionic surfactants include sodium alkylarylsulfonate, alpha-olefinsulfonate, and fatty alcohol sulfates.

Suitable nonionic surfactants are, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer and other like non-ionic compounds. Silicone surfactants can also be used.

Suitable cationic surfactants include, for example, amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, 2-alkyl-1-(2-hydroxyethyl)-2-imidazoline; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, naphthylene-substituted quaternary ammonium chloride such as dimethyl-1-naphthylmethylammonium chloride. The cationic surfactant can be used to provide sanitizing properties.

Suitable amphoteric surfactants include, for example, betaines, imidazolines, amine oxides, and propinates. The amphoteric surfactant may comprise an amine oxide, preferably the amphoteric surfactant comprises $C_{12}$, $C_{14}$ and/or $C_{16}$ dimethyl amine oxides. Further preferably the amphoteric surfactant comprises laurylamine oxide. Most preferably, the amphoteric surfactant is laurylamine oxide.

Nonionic surfactants useful in the concentrate composition include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer and other like nonionic compounds. Silicone surfactants can also be used. The non-ionic surfactant may comprise alkyl polyglycosides (APG).

Alkylamidopropyl Betaine

Alkylamidopropyl betaine generally provide grease removal and augments foam.

The alkylamidopropyl betaine can comprise be a betaine such as cocoamidopropyl betaine, a capryloamidopropyl betaine, or a caprylamidopropyl betaine. The sulfobetaine can comprise N-decyl-N,N-dimethyl-3-ammonio-1-propanesulfonate or dimethyl-(2-hydroxyethyl)-(3-sulfopropyl) ammonium. A suitable sultaine can comprise an alkylamidopropyl hydroxysultaine such as lauramidopropyl hydroxysultaine. A suitable amphodiacetate can comprise an alkylamphoacetate. The alkylamidopropyl betaine may comprise cocamidopropyl betaine. Preferably the alkylamidopropyl betaine is cocamidopropyl betaine.

Further Additives

The concentrate composition may additionally comprises one or more additives of soil release polymers, polymeric dispersants, polysaccharides, abrasives, tarnish inhibitors, builders, enzymes, dyes, buffers, perfumes, opacifiers, hydrotropes, thickeners, processing aids, suds boosters, brighteners, anti-corrosive aids, stabilizers, antioxidants, solvents, and chelants.

The concentrate composition may include one or more chelating/sequestering agent(s) or builders. For a discussion of chelating agents/sequestrants, see Kirk-Othmer, Encyclopedia of Chemical Technology, Third Edition, volume 5, pages 339-366 and volume 23, pages 319-320.

Suitable sequestrants include, but are not limited to, organic chelating compounds that sequester metal ions in solution, particularly transition metal ions. Such sequestrants include organic amino- or hydroxy-polyphosphonic acid complexing agents (either in acid or soluble salt forms), carboxylic acids (e.g., polymeric polycarboxylate), hydroxycarboxylic acids, aminocarboxylic acids, or heterocyclic carboxylic acids, e.g., pyridine-2,6-dicarboxylic acid (dipicolinic acid).

The compositions may include organic chelating/sequestering agent(s). Organic chelating/sequestering agent(s) include both polymeric and small molecule chelating/sequestering agent(s). Organic small molecule chelating/sequestering agent(s) are typically organocarboxylate compounds or organophosphate chelating/sequestering agent(s). Polymeric chelating/sequestering agent(s) commonly include polyanionic compositions such as polyacrylic acid compounds.

Small molecule organic chelating/sequestering agent(s) include aminocarboxylic acid type sequestrant. Suitable aminocarboxylic acid type sequestrants include the acids or alkali metal salts thereof, e.g., amino acetates and salts thereof. Suitable aminocarboxylates include N-hydroxyethylaminodiacetic acid; hydroxyethylenediaminetetraacetic acid, nitrilotriacetic acid (NTA); ethylenediaminetetraacetic acid (EDTA); N-hydroxyethyl-ethylenediaminetriacetic acid (HEDTA); diethylenetriaminepenta-acetic acid (DTPA); ethylenediamine-tetraproprionic acid triethylenetetraaminehexaacetic acid (TTNA), and alanine-N,N-diacetic acid; glutamic acid, N,N-diacetic acid (GLDA), methylglycinediacetic acid (MGDA), iminodisuccinate (IDS) and the like, and the respective alkali metal, ammonium and substituted ammonium salts thereof, and mixtures thereof. Preferably, the chelating agent may comprise glutamic acid-N,N-diacetic acid.

The chelating agent may be included in the concentrate composition in an amount of 30 wt. %, in an amount of 25 wt. %, in an amount of 20 wt. %, in an amount of 15 wt. % or in an amount of 10 wt. %.

These additional ingredients can be pre-formulated with the compositions of the invention or added to the composition before, after, or substantially simultaneously with the addition of the other components of the present invention. Additionally, the compositions can be used in conjunction with one or more conventional cleaning agents, e.g., an alkaline detergent.

Use Solutions

A use solution for disinfecting and cleaning hard surfaces may be prepared from the concentrate composition by diluting the aqueous concentrate with water at a dilution ratio that provides a use solution having desired antimicrobial and cleaning properties. The water that is used to dilute the concentrate composition to form the use composition can be referred to as water of dilution or a diluent, and can vary from one location to another.

The use solution comprises up to 6 wt. % of the concentrate composition. The use solution may comprise 0.1 to 6 wt. % of the concentrate composition, the use solution may comprise 0.2 to 5.5 wt. % of the concentrate composition, the use solution may comprise 0.3 to 5 wt. % of the concentrate composition, the use solution may comprise 0.4 to 4.5 wt. % of the concentrate composition, the use solution may comprise 0.5 to 4 wt. % of the concentrate composition, the use solution may comprise 0.6 to 3.5 wt. % of the concentrate composition, the use solution may comprise 0.7 to 3 wt. % of the concentrate composition, the use solution may comprise 0.7 to 2.5 wt. % of the concentrate composition, the use solution may comprise 0.7 to 2 wt. % of the concentrate composition, or the use solution may comprise 0.7 to 1.5 wt. % of the concentrate composition.

It should be understood that the consumer or buyer of the concentrate composition can dilute the concentrate to any suitable use solution without diverting from the invention. It should further be understood that any higher concentration of the use solution can be chosen to provide a faster disinfecting efficiency, such as a disinfection efficacy according to one or more of the European standard test methods EN 1650, EN 1276 and EN 13697+A1 accomplished at 1 min or below, without diverting from the invention.

The use solution may have a pH of 7.5 to 10. The use solution can preferably have a pH of 8 to 10, a pH of 8.5 to 10, or a pH of 8.5 to 9.5.

Method for Disinfecting and Cleaning Hard Surfaces

A method for disinfecting and cleaning hard surfaces comprises applying to the hard surface the inventive concentrate or the inventive use solution.

With this method, a disinfection efficacy according to one or more of the European standard test methods EN 1650, EN 1276 and EN 13697 is preferably obtained.

Specifically, the fungicidal and bactericidal activity was tested as specified by DIN EN 1650 (2019), DIN EN 1276 (2019) and DIN EN 13697 (2015)+A1 (2019).

The hard surface may be any solid surface in need of disinfection and cleaning, such as ware, countertop, tile, floor, wall, panel, window, plumbing fixture, kitchen and bathroom furniture, appliance, engine, circuit board, and dish. The hard surface may include, for example, health care surfaces and food processing surfaces. The hard surface may be one of ware, pots, pans, floors, walls, tiles, or countertops.

The inventive concentrate composition or the inventive use solution may be applied by soaking, spraying, wiping, foaming or the like.

Method for Making the Concentrate Composition and the Use Solution

The present invention provides a method of making a concentrate composition for disinfecting and cleaning hard surfaces, the method comprising:

combining components a) to e) of the inventive concentrate composition as defined herein and agitating the combined components until a homogenous concentrate composition is formed.

The present invention also provides a method of making a use solution for disinfecting and cleaning hard surfaces, the method comprising:

combining components a) to e) of the inventive concentrate composition as defined herein, agitating the combined components until a homogenous concentrate composition is formed; and diluting the homogenous concentrate composition with water to obtain the use solution; wherein the use solution contains up to 6 wt. % of the concentrate composition or any of the concentrations as disclosed above.

EXAMPLES

Example 1: Disinfection Efficiency

Exemplary compositions are defined in table 1. These exemplary compositions were tested according to the test method EN 13697 (2015)+A1 (2019) for 5 minutes at 20° C. For these tests, the concentrate compositions were diluted with water to a 1%, 1.5% and 2% use solution. The disinfection efficiency was evaluated by analysing the reduction of *Staphylococcus aureus*, as *Staphylococcus aureus* was found to be the most challenging microorganism to kill.

As summarized in table 1, all exemplary compositions 1 to 8 provide a good reduction of *Staphylococcus aureus*. In contrast, the comparative composition failed at reducing *Staphylococcus aureus*.

TABLE 1

Reduction of *Staphylococcus aureus* by the exemplary compositions of the concentrate compared to a comparative composition. Log Red 1%, log Red 1.5%, and log Red 2% refers to the logarithmic reduction of *Staphylococcus aureus* by the use solution containing 1 wt. %, 1.5 wt. % and 2 wt. % concentrate composition respectively.

| | Comparative composition | Exemplary composition 1 | Exemplary composition 2 | Exemplary composition 3 | Exemplary composition 4 |
|---|---|---|---|---|---|
| Water | 48.1 wt. % | 58.8 wt. % | 54.1 wt % | 62.6 wt. % | 59.2 wt. % |
| Sodium Citrate (99%) | 16.1 wt. % | 12.8 wt. % | 9.8 wt. % | 12.8 wt. % | 12.8 wt. % |
| MGDA | | | | | |
| GLDA | | | 9.8 wt. % | | |
| APG | | | | | 4.9 wt. % |
| Laurylamine Oxide | 19.5 wt. % | 15.3 wt. % | 12.8 wt. % | 9.8 wt. % | 9.8 wt. % |
| Cocoamidopropyl Betaine | 13.6 wt. % | 7.7 wt. % | 7.8 wt. % | 7.7 wt. % | 7.7 wt. % |
| bis(3-aminopropyl)dodecylamine | 2.4 wt. % | 4.1 wt. % | 4.1 wt. % | 5.4 wt. % | 4.1 wt. % |
| Copper Chlorophyllin | 0.025 wt. % | 0.025 wt. % | 0.025 wt. % | 0.025 wt. % | 0.025 wt. % |
| Citric Acid | | 0.9 wt. % | 1.2 wt. % | 1.4 wt. % | 1.1 wt. % |
| pH | 11.2 | 9.73 | 9.66 | 9.66 | 9.62 |
| Log Red 1% | <1.74 | 5.12 | 5.12 | 3.75 | 4.05 |
| Log Red 1.5% | <1.74 | 5.12 | 5.12 | 5.12 | 5.12 |
| Log Red 2% | 2.09 | 5.12 | 5.12 | 5.12 | 5.12 |

| | Exemplary composition 5 | Exemplary composition 6 | Exemplary composition 7 | Exemplary composition 8 |
|---|---|---|---|---|
| Water | 56.2 wt. % | 61.9 wt. % | 54.2 wt % | 53.3 wt. % |
| Sodium Citrate (99%) | 9.8 wt. % | 7.9 wt. % | 18.8 wt. % | 4.9 wt. % |
| MGDA | 7.9 wt. % | | | 17.7 wt. % |
| GLDA | | 9.8 wt. % | | |
| APG | | | | |
| Laurylamine Oxide | 12.8 wt. % | 9.8 wt. % | 15.3 wt. % | 11.8 wt. % |
| Cocoamidopropyl Betaine | 7.7 wt. % | 4.9 wt. % | 7.7 wt. % | 7.6 wt. % |
| bis(3-aminopropyl)dodecylamine | 4.1 wt. % | 4.1 wt. % | 2.9 wt. % | 2.9 wt. % |

TABLE 1-continued

Reduction of *Staphylococcus aureus* by the exemplary compositions of the concentrate compared to a comparative composition. Log Red 1%, log Red 1.5%, and log Red 2% refers to the logarithmic reduction of *Staphylococcus aureus* by the use solution containing 1 wt. %, 1.5 wt. % and 2 wt. % concentrate composition respectively.

| | | | | |
|---|---|---|---|---|
| Copper Chlorophyllin | 0.025 wt. % | 0.025 wt. % | 0.025 wt. % | 0.025 wt. % |
| Citric Acid | 1.2 wt. % | 1.2 wt. % | 0.7 wt. % | 1.4 wt. % |
| pH | 9.77 | 9.67 | 9.56 | 9.74 |
| Log Red 1% | 3.75 | 5.73 | 3.33 | 3.3 |
| Log Red 1.5% | 5.12 | 5.12 | 4.31 | 5.12 |
| Log Red 2% | 5.12 | 5.12 | 5.12 | 5.12 |

The fungicidal and bactericidal activity of the use solution of the exemplary composition 1 was tested as specified by DIN EN 1650 (2019), DIN EN 1276 (2019) and DIN EN 13697 (2015)+A1 (2019).

TABLE 2

The exemplary composition 1 was tested at various use solution concentrations for efficient disinfection of bacteria and yeast.

| EN Norm | Bacteria/Yeast | Conditions | Time | Pass Concentration 20° C. [%] | Pass Concentration 40° C. [%] |
|---|---|---|---|---|---|
| EN1276 | Bacteria | Dirty | 5 min | 0.4% | 0.4% |
| EN13697 | Bacteria | Dirty | 5 min | 0.9% | 0.9% |
| EN1650 | Yeast | Dirty | 15 min | 0.8% | 0.4% |
| EN13697 | Yeast | Dirty | 15 min | 0.8% | 0.4% |

As can be seen on table 2, exemplary composition 1 passed the DIN EN 1276 (2019) and DIN EN 13697 (2015)+A1 (2019) tests at use solution concentrations of 0.4 wt. % to 0.9 wt %.

The use solution of the exemplary composition 1 and the exemplary composition 6 were further tested as specified in DIN EN 13697 (2015)+A1 (2019). The aim was to pass the EN 13697+A1 test method at 1% dilution of the concentrate composition. The exemplary compositions 1 and 6 were compared to the prior art disinfecting and cleaning compositions benchmark 1, benchmark 2, and benchmark 3.

As demonstrated by the results summarized in tables 3-7, the exemplary composition 1 and exemplary composition 6 are capable of reducing *Staphylococcus aureus* even at a dilution of 1 wt. % of the concentrate composition.

In contrast, the prior art compositions benchmark 1 and benchmark 2 showed a disinfecting effect only at higher concentrations of at least 1.5 wt. %, while benchmark 3 failed at reducing *Staphylococcus aureus* to a satisfactory degree even at a 2.0 wt. % dilution.

TABLE 3

The exemplary composition 1 was tested as specified in DIN EN 13697 (2015) + A1 (2019) at different dilutions of 1.0 wt. %, 1.5 wt. % and 2.0 wt. %.

| Conc. of the product [%] | Contact time [min] | IgR (IgN = 7.27) |
|---|---|---|
| 1 | 5 | >5.12 |
| 1.5 | | >5.12 |
| 2 | | >5.12 |

TABLE 4

The exemplary composition 6 was tested as specified in DIN EN 13697 (2015) + A1 (2019) at different dilutions of 1.0 wt. %, 1.5 wt. % and 2.0 wt. %.

| Conc. of the product [%] | Contact time [min] | IgR (IgN = 7.27) |
|---|---|---|
| 1 | 5 | 5.73 |
| 1.5 | | >5.12 |
| 2 | | >5.12 |

TABLE 5

The comparative composition (benchmark 1) was tested as specified in DIN EN 13697 (2015) + A1 (2019) at different dilutions of 1.0 wt. %, 1.5 wt. % and 2.0 wt. %.

| Conc. of the product [%] | Contact time [min] | IgR (IgN = 7.27) |
|---|---|---|
| 1 | 5 | <1.71 |
| 1.5 | | 7.14 |
| 2 | | 7.14 |

TABLE 6

The comparative composition (benchmark 2) was tested as specified in DIN EN 13697 (2015) + A1 (2019) at different dilutions of 1.0 wt. %, 1.5 wt. % and 2.0 wt. %.

| Conc. of the product [%] | Contact time [min] | IgR (IgN = 7.27) |
|---|---|---|
| 1 | 5 | <1.71 |
| 1.5 | | 7.14 |
| 2 | | 7.14 |

TABLE 7

The comparative composition (benchmark 3) was tested as specified in DIN EN 13697 (2015) + A1 (2019) at different dilutions of 1.0 wt. %, 1.5 wt. % and 2.0 wt. %.

| Conc. of the product [%] | Contact time [min] | IgR (IgN = 7.27) |
|---|---|---|
| 1 | 5 | <1.71 |
| 1.5 | | <1.71 |
| 2 | | 3.36 |

Benchmark 3 did not pass the EN 13697+A1 test at all, while the benchmark 2 and benchmark 1 only passed the test when applied in a higher concentration of at least 1.5% use solution. The inventive concentrate compositions already passed the EN 13697+A1 test when applied at the low concentration of 1% use solution.

Therefore, the inventive concentrate composition and its use solution provide an improved disinfection over prior art compositions as shown by the reduction of *Staphylococcus aureus*.

Example 2: Cleaning Efficiency

The exemplary composition 1 and the exemplary composition 6 were reviewed on their cleaning, degreasing and foaming capabilities within following tests:

Foaming behaviour test

Surface cleaning performance test

Manual dishwash performance

Foaming Behaviour Test

A specific amount of test solution gets rotated for a standardized amount of time in 250 ml measuring cylinder. The foam behaviour is being evaluated by noting height of foam over time and visual comparison on foam structure. The use solutions tested contained 0.5 wt. % of the respective composition.

results are compared to the values of a baseline treated with water only. The use solutions tested contained 1 wt. % of the respective composition.

The surface cleaning performance test was performed to analyse the spray and wipe application of the exemplary compositions 1 and 6 compared to benchmark 1, benchmark 2, and benchmark 3.

Figure 2:
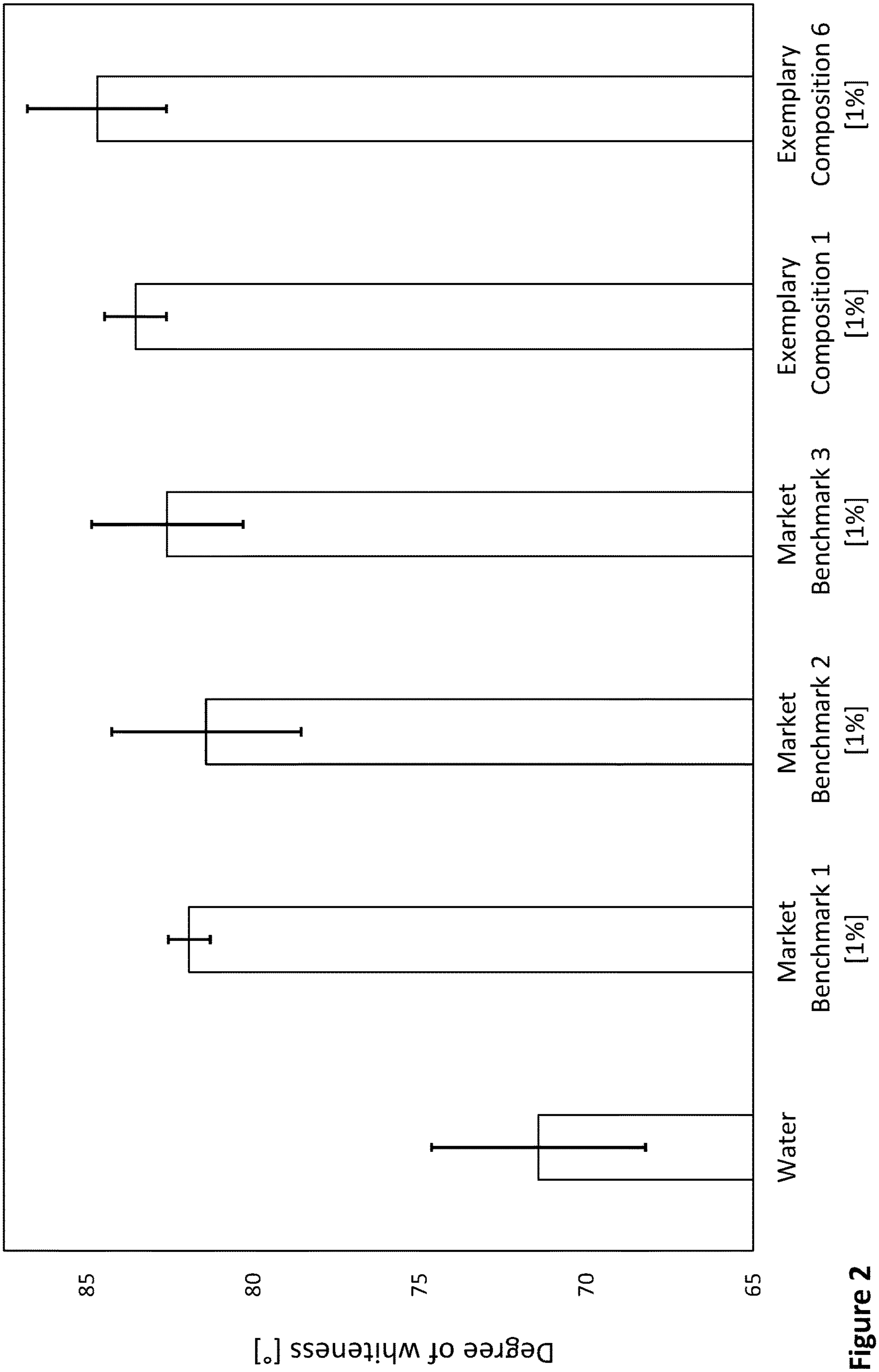
FIG. 2 shows the cleaning performance in spray and wipe applications of the exemplary compositions 1 and 6 compared to the prior art compositions benchmark 1, benchmark 2 and benchmark 3 according to the surface cleaning performance test.

The results are summarizes in FIG. 2. The exemplary compositions 1 and 6 show a better cleaning performance against benchmark 1 and benchmark 2 as well as benchmark 3.

Manual Dishwash Performance

The dishwashing capacity of a manual dishwash detergent is evaluated in an automatic scrubbing machine by amount of standardized soiled plates that can be scrubbed until the foam film breaks. Additionally, the rinse effect of the water film as well as soil residues on the plates are evaluated. The use solutions tested contained 0.5 wt. % of the respective composition.

Figure 3:
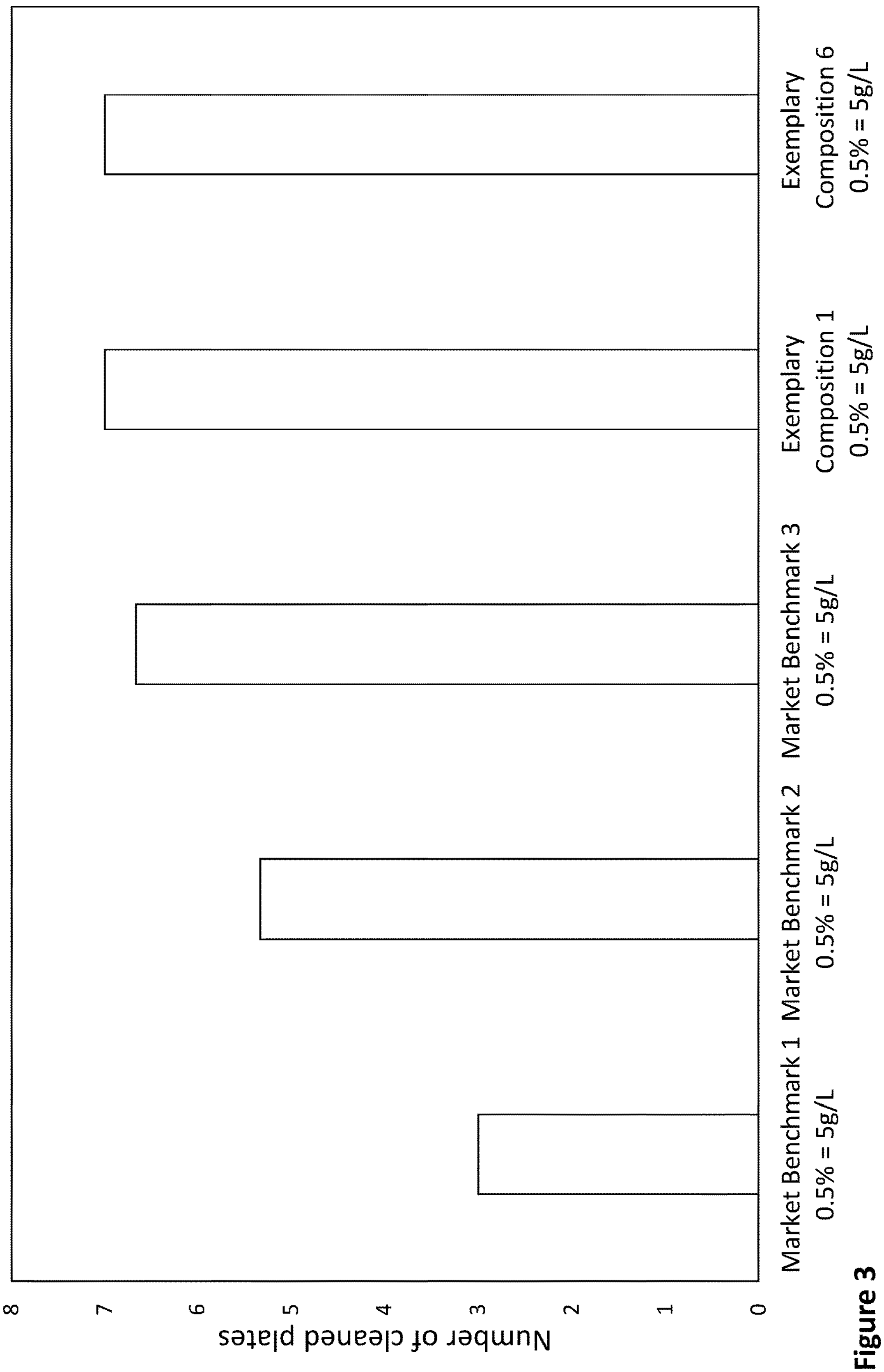
FIG. 3 shows the cleaning performance of the exemplary compositions 1 and 6 compared to the prior art compositions benchmark 1, benchmark 2 and benchmark 3 according to according to the manual dishwash performance.

The results of the manual dishwash performance are summarized in FIG. 3. Again, the exemplary compositions 1 and 6 show a better cleaning performance against benchmark 1 and benchmark 2. The performance of benchmark 3 was similar to the cleaning performance of the exemplary compositions 1 and 6.

CONCLUSION

To conclude, the exemplary compositions 1 and 6 provide an improved disinfection and reduction of *Staphylococcus aureus* when tested with the methods according to DIN EN 1650 (2019), DIN EN 1276 (2019) and DIN EN 13697 (2015)+A1 (2019). Especially the exemplary composition 1 demonstrated an advantageous cleaning efficiency when tested with the foaming behaviour test, the surface cleaning performance test, and the manual dishwash performance.

| | Cleaning | | | Disinfection | | |
|---|---|---|---|---|---|---|
| | | surface | | | | |
| | foaming behaviour test | cleaning performance test | manual dishwash performance | DIN EN 13697 at 1% | DIN EN 13697 at 1.5% | DIN EN 13697 at 2% |
| Benchmark 2 | 3 | 3 | 3 | 1 | 4 | 4 |
| Benchmark 1 | n.a. | 1 | 1 | 1 | 4 | 4 |
| Exemplary composition 1 | 4 | 4 | 4 | 4 | 4 | 4 |
| Exemplary composition 6 | 4 | 4 | 2 | 4 | 4 | 4 |
| Benchmark 3 | 3 | 3 | 3 | 1 | 1 | 1 |

As can be seen by the results of the foam behaviour test in FIG. 1, the exemplary compositions 1 and 6 provide a better foaming performance compared to the prior art compositions benchmark 2, and benchmark 3.

The exemplary compositions 1 and 6 show higher foam volume that decreases faster. Benchmark 1 was not included in the test as its foaming performance is known to be worse than benchmark 2.

Surface Cleaning Performance Test

The cleaning solution to be tested is poured on artificially soiled white PVC test stripes. A sponge with a defined amount of cleaning solution is moved back and forth over the soiled strip with a fixed pressure. The test strips whiteness is analysed by a colour spectrophotometer and the The term "n.a." refers to not available. A rating of 1=failed; 2=mediocre; 3=satisfactory; and 4=excellent.

Exemplary compositions 1 and 6 are both bringing the aimed results for EN 13697+A1 against the challenging *Staphylococcus aureus*. The exemplary composition 1 showed the best results within all tests, including the cleaning tests. The exemplary composition 6 had a slightly worse performance in oil removal. However, both m exemplary compositions show an improved performance against the prior art compositions.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

The invention claimed is:

1. A concentrate composition for disinfecting and cleaning hard surfaces comprising:
- a) a biocidal active substance comprising bis(3-aminopropyl)alkylamine, wherein the alkyl group consists of 6 to 18 carbon atoms;
- b) at least 20 wt. % of two or more amphoteric surfactants, wherein the two or more amphoteric surfactants comprise an amine oxide and an alkylamidopropyl betaine, wherein the alkyl group consists of 6 to 19 carbon atoms;
- c) a buffer system for adjusting the pH of said concentrate composition to 8 to 11;
- d) water; and wherein the composition is free of quaternary ammonium compounds, enzymes, hydrotropes, and organic solvents.

2. The concentrate composition according to claim 1, wherein the concentrate composition has a pH of 9 to 10.5.

3. The concentrate composition according to claim 1, wherein the composition is further substantially free of phosphorous-containing compounds.

4. The concentrate composition according to claim 1, wherein the composition comprises:
- a) 0.5 to 10 wt. % the biocidal active substance;
- b) 1 to 30 wt. % of the amine oxide, and 1 to 15 wt. % of the alkylamidopropyl betaine;
- c) 1 to 30 wt. % buffer system; and
- d) 20 to 80 wt. % water.

5. The concentrate composition according to claim 1, wherein the composition comprises:
- a) 2 to 5 wt. % the biocidal active substance;
- b) 20 to 45 wt. % of the two or more amphoteric surfactants;
- c) 5 to 15 wt. % buffer system; and
- d) 30 to 70 wt. % water.

6. The concentrate composition according to claim 1, wherein the composition further comprises one or more of soil release polymers, polymeric dispersants, polysaccharides, abrasives, tarnish inhibitors, builders, dyes, buffers, perfumes, opacifiers, thickeners, processing aids, suds boosters, brighteners, anti-corrosive aids, stabilizers, antioxidants, or chelants.

7. The concentrate composition according to claim 1, wherein the bis(3-aminopropyl)alkylamine comprises one or more of bis(3-aminopropyl) octylamine, bis(3-aminopropyl) decylamine, bis(3-aminopropyl) dodecylamine, bis(3-aminopropyl) quatrodecylamine, bis(3-aminopropyl) hexadecylamine, or bis(3-aminopropyl) octadecylamine.

8. The concentrate composition according to claim 1, wherein the buffer system is a citrate buffer system.

9. The concentrate composition according to claim 1, wherein the composition achieves a ≥5.0 $\log_{10}$ reduction of *Staphylococcus aureus* within 5 minutes at 20° C. at a 1.0 wt. % use-solution according to EN 13697 (2015)+A1 (2019).

10. The concentrate composition according to claim 1, wherein the composition further comprises a non-ionic surfactant.

11. The concentrate composition according to claim 1, wherein the alkylamidopropyl betaine comprises cocamidopropyl betaine.

12. The concentrate composition according to claim 1, wherein the composition further comprises a chelating agent that comprises glutamic acid-N,N-diacetic acid.

13. A method for disinfecting and cleaning hard surfaces, the method comprising:

applying to the hard surface a concentrate composition according to claim 1.

14. The method according to claim 13, wherein a disinfection efficacy according to one or more of the European standard test methods EN 1650 (2019), EN 1276 (2019) and EN 13697 (2015) in combination with A1 (2019) is obtained.

15. The method according to claim 13, wherein the hard surface is one of ware, pots, pans, floors, walls, tiles, or countertops.

16. The method according to claim 13, wherein the concentrate composition is applied by soaking, spraying, wiping or foaming.

* * * * *